US012342417B2

(12) United States Patent
Si et al.

(10) Patent No.: US 12,342,417 B2
(45) Date of Patent: Jun. 24, 2025

(54) POSITIONING METHOD AND TERMINAL

(71) Applicant: VIVO MOBILE COMMUNICATION CO., LTD., Guangdong (CN)

(72) Inventors: Ye Si, Dongguan (CN); Peng Sun, Dongguan (CN); Wei Bao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 541 days.

(21) Appl. No.: 17/360,642

(22) Filed: Jun. 28, 2021

(65) Prior Publication Data

US 2021/0329443 A1 Oct. 21, 2021

Related U.S. Application Data

(63) Continuation of application No. PCT/CN2019/125031, filed on Dec. 13, 2019.

(30) Foreign Application Priority Data

Jan. 4, 2019 (CN) .......................... 201910007943.X

(51) Int. Cl.
*H04W 8/08* (2009.01)
*H04W 64/00* (2009.01)
*H04W 74/0833* (2024.01)
*H04W 76/25* (2018.01)

(52) U.S. Cl.
CPC ............. *H04W 8/08* (2013.01); *H04W 64/00* (2013.01); *H04W 74/0833* (2013.01); *H04W 76/25* (2018.02)

(58) Field of Classification Search
CPC ....... H04W 8/08; H04W 76/25; H04W 64/00; H04W 74/0833
USPC ........................................... 370/329
See application file for complete search history.

(56) References Cited

U.S. PATENT DOCUMENTS

| 8,872,701 | B2 | 10/2014 | Cheng et al. | |
|---|---|---|---|---|
| 10,805,946 | B2 | 10/2020 | Chen et al. | |
| 10,993,273 | B2 | 4/2021 | Chen et al. | |
| 2018/0054796 | A1* | 2/2018 | Edge | H04W 4/029 |
| 2020/0217918 | A1* | 7/2020 | Rydén | H04W 4/029 |

FOREIGN PATENT DOCUMENTS

| CN | 107105498 A | 8/2017 |
|---|---|---|
| CN | 107370573 A | 11/2017 |
| CN | 107371264 A | 11/2017 |
| JP | 2014528218 A | 10/2014 |

(Continued)

OTHER PUBLICATIONS

International Search Report and Written Opinion of the International Searching Authority regarding International Patent Application No. PCT/CN2019/125031, dated Mar. 12, 2020. Translation provided by Bohui Intellectual Property.

(Continued)

*Primary Examiner* — Intekhaab A Siddiquee
(74) *Attorney, Agent, or Firm* — Harness, Dickey & Pierce, P.L.C.

(57) ABSTRACT

A positioning method includes: receiving configuration information; and determining, in idle state or inactive state based on the configuration information, whether to enter connected state at a preset moment to complete a positioning procedure.

20 Claims, 3 Drawing Sheets

(56) References Cited

FOREIGN PATENT DOCUMENTS

| KR | 20140097427 A | 8/2014 | |
|---|---|---|---|
| WO | WO-2011097730 A1 * | 8/2011 | ............ H04W 24/10 |
| WO | WO-2013077622 A1 | 5/2013 | |
| WO | WO-2018038799 A1 | 3/2018 | |
| WO | WO-2018060968 A1 * | 4/2018 | ............ H04W 64/00 |
| WO | WO-2018085017 A1 | 5/2018 | |
| WO | WO-2018141087 A1 | 8/2018 | |

OTHER PUBLICATIONS

First Office Action regarding Chinese Patent Application No. CN201910007943.X, dated Dec. 1, 2020. Translation provided by Bohui Intellectual Property.

"Key Issues and Solutions for Location Support for CIoT Devices-1," Qualcomm Inc., SA WG2 Meeting #116bis, S2-164846, Sep. 2, 2016.

"Solutions, Evaluation and Conclusions for Sub-issues 5.3, 5.4 and 5.7," Qualcomm Inc., SA WG2 Meeting #118, S2-166882, Nov. 18, 2016.

"Addition of Impacts and Evaluations for Location Services Solutions," Qualcomm Inc., SA WG2 Meeting #117, S2-166200, Oct. 23, 2016.

Supplementary European Search Report regarding International Patent Application No. 19907617.5-1218/3908012; PCT/CN2019/125031, dated Jan. 24, 2022.

3rd Generation Partnership Project; Technical Specification Group Services and Systems Aspects; Functional stage 2 description of Location Services (LCS) (Release 15); 3GPP TS 23.271 v15.1.0, dated Sep. 2018.

First Office Action regarding Indian Patent Application No. 202147030720, dated Apr. 29, 2022.

First Office Action regarding Japanese Patent Application No. 2021-537168, dated Jul. 15, 2022. Translation provided by Bohui Intellectual Property.

First Office Action regarding Korean Patent Application No. 10-2021-7021544, dated Oct. 31, 2022. Translation provided by Bohui Intellectual Property.

Second Office Action regarding Japanese Patent Application No. 2021-537168, dated Feb. 17, 2023. Translation provided by Bohui Intellectual Property.

* cited by examiner

POSITIONING METHOD AND TERMINAL

CROSS-REFERENCE TO RELATED APPLICATIONS

This application is a Bypass Continuation Application of PCT/CN2019/125031, filed on Dec. 13, 2019, which claims priority to Chinese Patent Application No. 201910007943.X, filed on Jan. 4, 2019 in China, which are incorporated herein by reference in their entirety.

TECHNICAL FIELD

The present disclosure relates to the field of communications technologies, and in particular, to a positioning method and a terminal.

BACKGROUND

A mobile communications system supports two types of location requests: an immediate location request and a deferred location request. The immediate location request requires a location service (LCS) server to return a positioning result to an LCS client immediately after receiving a location request. The deferred location request requires the LCS server to feed back a report (response) at a specified time after receiving the location request. The deferred location request triggers a deferred positioning event, and deferred positioning events are classified into a periodic event (Periodic location event), an area event, a motion event, and a terminal available event.

SUMMARY

According to a first aspect, some embodiments of the present disclosure provide a positioning method, applied to a terminal and including:
  receiving configuration information; and
  determining, in idle state or inactive state based on the configuration information, whether to enter connected state at a preset moment to complete a positioning procedure.
According to a second aspect, some embodiments of the present disclosure provide a terminal, including:
  a receiving module, configured to receive configuration information; and
  a processing module, configured to determine, in idle state or inactive state based on the configuration information, whether to enter connected state at a preset moment to complete a positioning procedure.
According to a third aspect, some embodiments of the present disclosure provide a terminal. The terminal includes a processor, a memory, and a program that is stored in a memory and executable on the processor, and when the processor executes the program, the steps of the foregoing positioning method are implemented.
According to a fourth aspect, some embodiments of the present disclosure provide a non-transitory computer-readable storage medium. The non-transitory computer-readable storage medium stores a computer program, and when a processor executes the computer program, the steps of the foregoing positioning method are implemented.

BRIEF DESCRIPTION OF DRAWINGS

To describe the technical solutions in the embodiments of the present disclosure more clearly, the following briefly describes the accompanying drawings required for describing the embodiments of the present disclosures. Apparently, the accompanying drawings in the following description show merely some embodiments of the present disclosure, and a person of ordinary skill in the art may still derive other drawings from these accompanying drawings.

DESCRIPTION OF EMBODIMENTS

Figure 1:
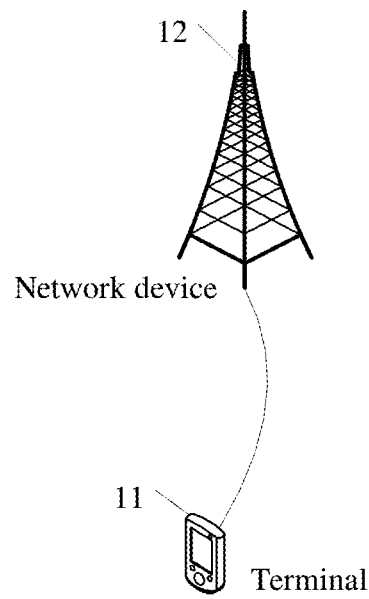
FIG. 1 is a block diagram of a mobile communications system to which some embodiments of the present disclosure can be applied.

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. Instead, these embodiments are provided in order to provide a more thorough understanding of the present disclosure and to be able to convey the scope of the present disclosure to a person skilled in the art.

In the specification and claims of this application, the terms "first", "second", and the like are intended to distinguish between similar objects but do not necessarily describe a specific order or sequence. It should be understood that the data termed in such a way is interchangeable in proper circumstances so that the embodiments of this application described herein can be implemented in an order other than the order illustrated or described herein. Moreover, the terms "include", "contain" and any variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. "And/or" used in the specification and claims means at least one of the connected objects.

The technology described in this specification is not limited to a Long Term Evolution (LTE)/LTE-Advanced (LTE-A) system, and can also be used in various wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" are often used interchangeably. The technology described herein can be used in the above-mentioned systems and radio technologies as well as other systems and radio technologies. However, the following descriptions describe a new radio NR system for example purposes, and NR terms are used in most of the following descriptions, although these techniques can also be applied to an application other than an NR system application.

The following description provides examples and does not limit the scope, applicability, or configuration set forth in the claims. The functions and arrangements of the elements under discussion may be changed without departing from the spirit and scope of the present disclosure. In various examples, various procedures or components may be omitted, replaced, or added appropriately. For example, the described method may be performed in an order different from that described, and steps may be added, omitted, or combined. In addition, features described with reference to some examples may be combined in other examples.

Referring to FIG. 1, FIG. 1 is a block diagram of a wireless communications system to which some embodiments of the present disclosure can be applied. The wireless communications system includes a terminal 11 and a network device 12. The terminal 11 may also be referred to as a terminal device to user equipment (UE). The terminal 11 may be a terminal side device such as a mobile phone, a tablet personal computer, a laptop computer, a personal digital assistant (PDA), a mobile Internet device (MID), a wearable device, or an in-vehicle device. It should be noted that a specific type of the terminal 11 is not limited in some embodiments of the present disclosure. The network device 12 may be a base station or a core network. The base station may be a base station of 5G or a later version (for example, a gNB or a 5G NR NB), or a base station in another communications system (for example, an eNB, a wireless local area network WLAN access point, or another access point). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specified technical term. It should be noted that, in some embodiments of the present disclosure, only a base station in the NR system is used as an example, but a specific type of the base station is not limited.

The base station may communicate with the terminal 11 under control of a base station controller. In various examples, the base station controller may be a core network or a part of some base stations. Some base stations may communicate control information or user data with the core network through a backhaul. In some examples, some of these base stations may communicate directly or indirectly with each other through a backhaul link, and the backhaul link may be a wired or wireless communication link. The wireless communications system can support operations on a plurality of carriers (waveform signals of different frequencies). A multi-carrier transmitter can simultaneously transmit a modulated signal on the multiple carriers. For example, each communication link may be a multi-carrier signal modulated based on various radio technologies. Each modulated signal can be sent over different carriers and can carry control information (for example, a reference signal or a control channel), overhead information, data, and the like.

The base station can communicate wirelessly with the terminal 11 via one or more access point antennas. Each base station may provide communication coverage for a corresponding coverage area. A coverage area of an access point may be divided into sectors that form merely a part of the coverage area. The wireless communications system may include different types of base stations (for example, a macro base station, a micro base station, or a pico base station). The base station may also utilize different radio technologies, such as a cellular or WLAN radio access technology. The base station can be associated with the same or different access networks or operator deployment. Coverage areas of different base stations (including coverage areas of the same type of base station or different types of base stations, coverage areas using the same radio technology or different radio technologies, or coverage areas belonging to the same access network or different access networks) may overlap.

A communication link in the wireless communications system may include an uplink used to carry uplink (UL) transmission (for example, from the terminal 11 to the network device 12), or a downlink used to carry a downlink (DL) transmission (for example, from the network device 12 to the terminal 11). The UL transmission may also be referred to as reverse link transmission, and the DL transmission may also be referred to as forward link transmission.

In a mobile communications system, such as a 5G system, a terminal supports three states: idle state, inactive state, and connected state. In idle state, the terminal does not have a Radio Resource Control (RRC) context on a network device side, that is, a parameter required for communication between the network device side and the terminal does not belong to a specific cell, and the network device side does not know whether the terminal exists. A group of tracking area identifier (TAI) lists are allocated to the terminal. From the perspective of the core network, connection between a RAN side and the core network is served. To reduce power consumption, the terminal is in sleep state most of the time, and therefore data transmission cannot be performed. In a downlink link, the terminal in idle state may periodically wake up to receive a paging message (if any) from the network device side. Mobility may be processed by the terminal by performing cell reselection. In idle state, the terminal does not keep uplink synchronization with the network device side. To switch from idle state to connected state, an RRC context can be established between the terminal and the network device side only through random access.

In connected state, the terminal and the network device may establish an RRC context, and all parameters required for communication are known to both parties. From the perspective of the core network, the terminal is in connected state in the core network. A cell to which the terminal belongs is known, and a signaling destination device identifier used for transmission between the terminal and the network device, that is, a cell radio network temporary identifier (C-RNTI), has been configured. Data may be transmitted in connected state. However, because a data stream of a packet is often burst, when no data stream is transmitted, power consumption can be reduced by disabling a receiving circuit of the terminal, and a discontinuous reception (DRX) technology is used. Because the RRC context has been established in connected state in the network device, a speed of exiting the DRX and starting to receive/send data is relatively fast. In connected state, mobility may be controlled by the network device side, that is, the terminal provides neighboring cell measurement for the network, and the network device instructs the terminal to perform handover. Uplink time synchronization may or may not exist. When data is to be transmitted, uplink synchronization may be established through random access.

In inactive state, an RRC context between the network device side and the terminal side is maintained. From the perspective of the core network, a RAN side is connected to the core network. Therefore, switching from inactive state to connected state is very fast, and core network signaling is not required. In addition, the terminal is allowed to sleep in a manner similar to idle state, and mobility is processed through cell reselection. Therefore, inactive state may be considered as a mixture of idle state and connected state.

The periodic event is: periodically initiating or canceling a location report, that is, triggering a location report at a specific time interval based on a request period.

The area event: When the terminal detects that the terminal enters, leaves, or is within a specified target area range, the terminal completes a complete positioning process with a network, and the LCS server reports a location of a target terminal once. In the case of the area event, a target area may be defined by a geographical area, a public land mobile network (PLMN) identifier, a country code, or a geopolitical name.

The motion event: When the terminal detects that the terminal moves from a previous location beyond a predefined linear distance, the terminal completes a complete positioning process with the network, and the LCS server reports a location of a target terminal once. The process supports terminal mobility between different serving mobile management entities (MME) and different serving PLMNs without interrupting event reporting.

Terminal available event: When the terminal is temporarily unavailable due to inactivity of a user, temporary loss of a radio connection or separation of an international mobile subscriber identity (IMSI), or the like, the terminal may delay reporting a location of the terminal. For the terminal available event, the terminal does not need to participate in event detection, and a positioning behavior is not triggered by the event.

For the periodic event, the area event, and the motion event, the terminal needs to participate in event detection. Therefore, the terminal needs to store event information and related auxiliary information that trigger positioning, for example, area information in area event triggering, and time information of the periodic event.

To reduce power consumption of the terminal, the terminal may enter idle (idle) state. The terminal in idle state is in sleep state in most of the time, and periodically wakes up in a downlink to receive a paging message. Alternatively, the terminal may enter inactive state. The terminal in inactive state allows UE to sleep in a manner similar to idle state, and keeps a connection between a radio access network (RAN) and a core network side, to quickly switch to connected state. However, regardless whether the terminal is in idle state or inactive state, after a periodic event, an area event, or a motion event is detected, a connection between the terminal and an MME needs to be established, that is, the terminal is restored to connected state, and positioning related information is reported and a positioning procedure is completed. If information needs to be reported many times, and the terminal needs to enter connected state each time, especially for periodic positioning (such as a periodic event), the terminal needs to enter connected state to complete a complete positioning process each time the terminal detects that a period arrives, and for event trigger (such as an area event or a motion event) positioning, the terminal needs to enter connected state to complete a complete positioning process each time a maximum reporting interval arrives, resulting in a large amount of power consumption of the terminal.

Figure 2:
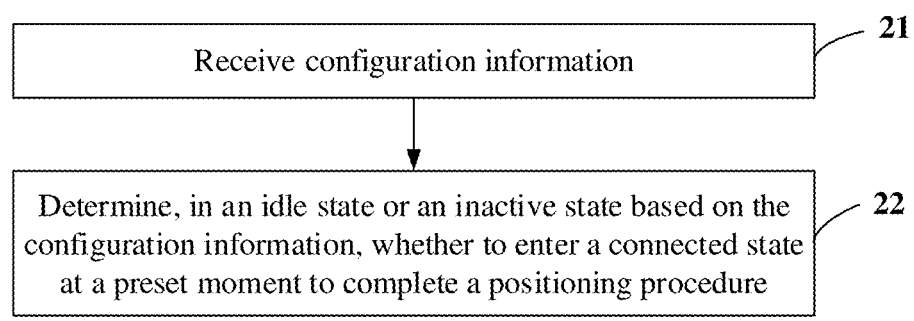
FIG. 2 is a schematic flowchart of a positioning method according to some embodiments of the present disclosure.

The positioning method in some embodiments of the present disclosure is applied to a terminal side. As shown in FIG. 2, the method includes the following steps.

Step 21: Receive configuration information.

The configuration information is used to indicate a detection condition of the terminal at a preset moment. The preset moment is related to a positioning event, especially to a deferred positioning event. The deferred positioning event is triggered based on a deferred location request.

Step 22: Determine, in idle state or inactive state based on the configuration information, whether to enter connected state at a preset moment to complete a positioning procedure.

The preset moment is related to a deferred positioning event, for example, a positioning reporting moment corresponding to the deferred positioning event. If the terminal in some embodiments of the present disclosure determines, in idle state or inactive state based on the configuration information, that the terminal does not need to enter connected state at the preset moment, performing of an unnecessary positioning procedure can be reduced, thereby saving power of the terminal. If the terminal determines, based on the configuration information, that the terminal needs to enter connected state at the preset moment and perform a positioning procedure, a necessary positioning procedure is not missed, thereby facilitating mobility management of the terminal.

Optionally, the preset moment includes a period corresponding to a periodic event or time of arrival of a maximum reporting interval corresponding to a trigger event. In other words, the preset moment is one of the following moments:

For the periodic event, a network device side instructs, by using the configuration information, the terminal to perform detection when a next period arrives, to determine whether the terminal enters connected state, that is, to initiate a connection to the network device.

For the trigger event, the network device side instructs, by using the configuration information, the terminal to perform detection at the time of arrival of the maximum reporting interval, to determine whether the terminal enters connected state. It should be noted that for the trigger event, the network device configures a minimum reporting interval and a maximum reporting interval for the terminal. When the terminal does not detect a corresponding trigger event within a time period between a minimum reporting interval and a maximum reporting interval after a previous report, the terminal detects whether to enter connected state at time of arrival of the maximum reporting interval.

The trigger event is triggered based on the time of arrival of the maximum reporting interval. Optionally, the trigger event includes an area event or a motion event, and the area event and the motion event correspond to respective maximum reporting intervals. For the area event or the motion event, the network device side instructs, by using the configuration information, the terminal to perform detection at the time of arrival of the maximum reporting interval, to determine whether the terminal enters connected state. Optionally, if the terminal detects the area event or the motion event within a time period between a minimum reporting interval and a maximum reporting interval, the terminal enters connected state and performs a subsequent positioning procedure. However, if the terminal does not detect the area event or the motion event within this period of time, it needs to further detect, at the time of arrival of the maximum reporting interval, whether the terminal enters connected state.

In some embodiments of the present disclosure, step 22 includes: detecting, at the preset moment, whether a detection condition in the configuration information is met; and if the detection condition is met, skipping entering connected state.

If the detection condition is not met, connected state is entered to complete the positioning procedure.

In other words, the terminal detects the corresponding condition at the preset moment based on the received configuration information, and determines whether to enter connected state at the preset moment and performs the positioning procedure.

The detection condition includes one of the following:

A moving distance of the terminal from the previous positioning being no more than a first preset threshold. That is, the terminal detects that no movement or small movement occurs at a current moment compared with a previous positioning report, and the moving distance being no more than the first preset threshold on the network device side. The detection condition is determined by the terminal only through movement of the terminal. The terminal does not know a location of the terminal, but the terminal knows a moving distance from a previous location.

A change amount between a current location estimate of the terminal and a location estimate during the previous positioning (for example, obtained through GPS or Bluetooth) being no more than a second preset threshold. That is, the terminal detects that location estimation of the terminal does not change or slightly changes compared with the previous positioning report, and a change range being no more than the second preset threshold of the network device side.

A change amount between a current location measurement amount of the terminal and a location measurement amount during the previous positioning being no more than a third preset threshold. The terminal measures a downlink reference signal in inactive state or idle state. The terminal detects that the location measurement amount of the terminal does not change or slightly changes compared with the previous positioning report, and a change range being no more than the third preset threshold. The location measurement amount may be obtained in the following manner: the location measurement is obtained after the terminal measures a downlink positioning reference signal in inactive state or idle state based on downlink positioning auxiliary information broadcast by the network device side or downlink positioning auxiliary information sent in advance in connected state. The location measurement amount includes: a reference signal time difference (RSTD), reference signal received power (RSRP), or other measurement information in observed time difference of arrival (OTDOA) positioning. For example, the terminal determines, based on a change of the RSTD in the OTDOA positioning, whether the third preset threshold is exceeded. A downlink reference signal may include at least one of a positioning reference signal (PRS), a synchronization signal block (SSB), or a channel state information-reference signal (CSI-RS) resource set.

Optionally, after step 22, the method further includes: reporting indication information when it is determined not to enter connected state, where the indication information includes one of the following:

First indication information indicating that no movement of the terminal occurs: Optionally, the first indication information includes one indication bit. If the terminal detects that a location, location estimation, or a location measurement amount of the terminal does not change compared with the previous positioning report, the terminal reports 1-bit information to indicate that the terminal does not move.

Second indication information indicating location difference information of the terminal: Optionally, the second indication information includes N indication bits, and N is an integer greater than 1. The terminal detects that a location, location estimation, or location measurement information of the terminal changes but being no more than a threshold. If the terminal has the location of the terminal, the terminal may report N-bit location difference information to indicate a change range of the location. If the terminal reports the N-bit location difference information, for example, a location estimation difference value, the N-bit information may be obtained in the following manner: Assuming that a difference between coordinates of all dimensions (three-dimensional or two-dimensional) of the location estimate of the terminal and coordinates of all dimensions of location estimation during the previous positioning is less than a threshold predefined by the network, the terminal reports the N-bit information to notify the network device of a change status of location estimation of the terminal. The N-bit information includes: positive and negative information of each dimension coordinate value and a bit quantized value corresponding to an absolute difference of each dimension coordinate value.

Third indication information indicating a difference value of positioning measurement information of the terminal: The terminal detects that a location, location estimation, or location measurement information of the terminal changes but being no more than a threshold, and the terminal measures a downlink positioning reference signal in inactive state or idle state based on downlink positioning auxiliary information broadcast by the network device side or downlink positioning auxiliary information sent in advance in connected state. Then, the terminal reports a difference value of N-bit positioning measurement information (for example, an RSTD quantization value), indicating a change range of the measurement information. If the terminal reports N-bit RSTD quantization value difference information, the N-bit information may be obtained in the following manner: Assuming that differences between all RSTD quantization values and all RSTD quantization values measured during the previous positioning are less than or equal to a threshold Y, the terminal reports the N-bit information to notify the network device of a change status of the location of the terminal. The N-bit information includes positive and negative information of an RSTD difference, quantity information of the RSTD difference (for example, a quantity of RSTD values required for one measurement), and a corresponding bit quantization value of an absolute value of each RSTD difference.

Optionally, the step of reporting indication information includes: reporting the indication information by using a message in a random access process. The random access process may be a contention-based random access process initiated based on a contention preamble, or may be a contention free random access process initiated based on a non-contention preamble.

Optionally, the step of reporting the indication information by using a message in a random access process includes: reporting the indication information by using message 1 (Msg1) in a contention free random access process. That is, the terminal initiates an RACH by using the non-contention preamble, and implicitly reports 1-bit or N-bit information by using a preamble packet in the Msg1.

Alternatively, the step of reporting the indication information by using a message in a random access process includes: reporting the indication information by using message 3 (Msg3) in a contention-based random access process. That is, the terminal initiates an RACH by using the contention preamble, and reports 1-bit or N-bit information in the Msg3 of the RACH.

Optionally, after the step of reporting the indication information by using a random access process, the method further includes: returning to idle state or inactive state after a random access response is received. Optionally, the terminal successfully receives message 2 (Msg2), and returns to original state, that is, idle state or inactive state. Alternatively, the terminal receives a message 4 (Msg4), and acknowledges that the network device successfully receives Msg3. The terminal returns to original state, that is, idle state or inactive state.

In addition, the step of reporting indication information includes: sending the indication information by using a data packet in inactive state. For example, if the terminal is in inactive state, 1-bit or N-bit information may be carried by using an inactive small data packet.

Optionally, step 21 in some embodiments of the present disclosure includes: receiving the configuration information by using non-access stratum (NAS) signaling. The network device may send the configuration information to the terminal by using signaling that is in NAS and that is related to a deferred positioning event, such as LCS periodic-triggered invoke (Periodic-Triggered Event Invoke) signaling or other dedicated signaling.

The following further describes the positioning methods in some embodiments of the present disclosure with reference to the accompanying drawings.

Figure 3:
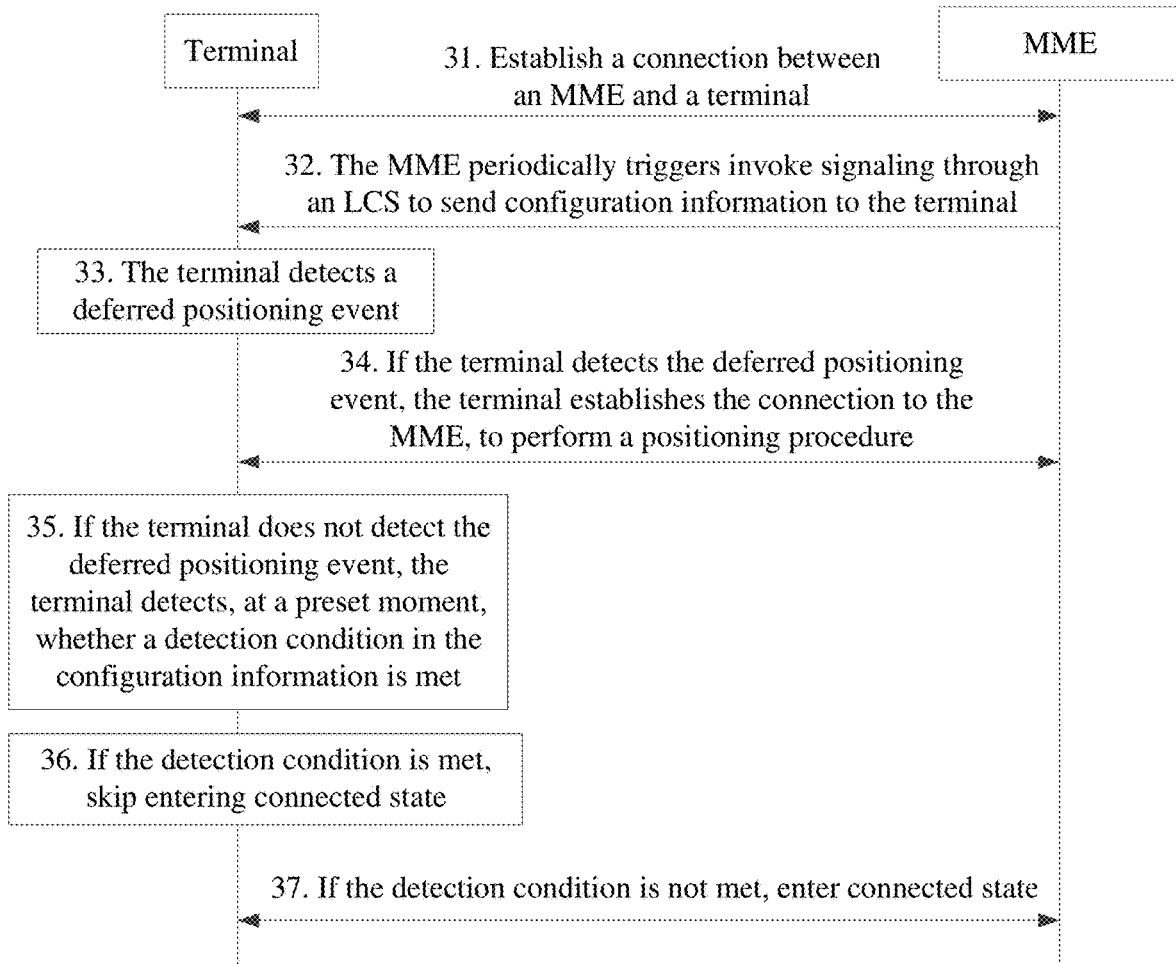
FIG. 3 is a schematic diagram of signaling interaction between a terminal and an MME in a positioning method according to some embodiments of the present disclosure.

As shown in FIG. 3, the method includes the following steps:

Step 31: Establish a connection between an MME and a terminal. If the terminal is not reachable, for example, in a power saving mode, the MME waits for the terminal to be reachable. If the terminal is reachable, the MME performs paging, authentication, and ciphering (paging, authentication and ciphering). The MME sends LCS location notification invoke signaling to the terminal to indicate activation and types of different location requests (deferred location request) and whether privacy verification is required.

Step 32: The MME periodically triggers invoke signaling through an LCS to send event-related information to the terminal. The related information includes: all event-related information received from a visitor gateway mobile location center (V-GMLC), an LDR reference number, an address of a home visitor gateway mobile location center (H-GMLC), a reported PLMN list, and QoS of any request when location estimation is required. The periodic trigger invoke signaling may further include the configuration information used to instruct the terminal to detect whether to enter connected state at the preset moment and perform the positioning procedure.

Step 33: The terminal detects a deferred positioning event (detect event). The deferred positioning event described herein includes a periodic event, an area event, or a motion event.

Step 34: If the terminal detects the deferred positioning event, the terminal establishes the connection to the MME, and the terminal sends relevant information about the deferred positioning event to the MME, to perform a positioning procedure. The terminal needs to send a report type, an LDR reference number, an address of an H-GMLC, information indicating whether location estimation is required, a location estimate, and information indicating whether a location request should be terminated after the current report to the MME.

Step 35: If the terminal does not detect the deferred positioning event, the terminal detects, at a preset moment, whether a detection condition in configuration information is met.

Step 36: If the detection condition is met, skip entering connected state.

Step 37: If the detection condition is not met, enter connected state, and complete a subsequent positioning procedure, that is, perform step 34.

In the positioning method in some embodiments of the present disclosure, the terminal determines, by using the configuration information, whether to enter connected state at the preset moment, instead of entering connected state to complete a complete positioning process when a period arrives or a maximum reporting interval arrives, thereby reducing power consumption of the terminal.

The foregoing embodiments describe the positioning method in different scenarios. The following further describes a terminal corresponding to the positioning method with reference to the accompanying drawings.

Figure 4:
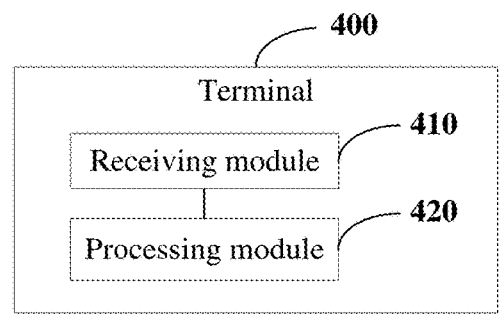
FIG. 4 is a schematic diagram of a module structure of a terminal according to some embodiments of the present disclosure.

As shown in FIG. 4, a terminal 400 in some embodiments of the present disclosure can implement details of the method in the foregoing embodiment in which configuration information is received; and it is determined, in idle state or inactive state based on the configuration information, whether to enter connected state at a preset moment to complete a positioning procedure, to achieve a same effect. The terminal 400 may include the following function modules:

a receiving module 410, configured to receive configuration information; and a processing module 420, configured to determine, in idle state or inactive state based on the configuration information, whether to enter connected state at a preset moment to complete a positioning procedure.

The preset moment includes a period corresponding to a periodic event or time of arrival of a maximum reporting interval corresponding to a trigger event.

The trigger event is triggered based on the time of arrival of the maximum reporting interval.

The trigger event includes an area event or a motion event, and the area event and the motion event correspond to respective maximum reporting intervals.

The processing module 420 includes:

a detection submodule, configured to detect, at the preset moment, whether a detection condition in the configuration information is met; and a first processing submodule, configured to: if the detection condition is met, skip entering connected state.

The processing module 420 further includes:

a second processing submodule, configured to: if the detection condition is not met, enter connected state and perform the positioning procedure.

The detection condition includes one of the following:

a moving distance of the terminal from the previous positioning being no more than a first preset threshold;

a change amount between a current location estimate of the terminal and a location estimate during the previous positioning being no more than a second preset threshold; and a change amount between a current location measurement amount of the terminal and a location measurement amount during the previous positioning being no more than a third preset threshold.

The terminal 400 further includes:

a reporting module, configured to report indication information when it is determined not to enter connected state, where the indication information includes one of the following:

first indication information indicating that the terminal does not move;

second indication information indicating location difference information of the terminal; and third indication information indicating a difference value of positioning measurement information of the terminal.

The first indication information includes one indication bit. The second indication information or the third indication bit includes N indication bits, and N is an integer greater than 1.

The reporting module includes:
a first reporting submodule, configured to report the indication information by using a message in a random access process;
or
a second reporting submodule, configured to send the indication information by using a data packet in inactive state.

The first reporting submodule includes:
a first reporting unit, configured to report the indication information by using message 1 in a contention free random access process;
or
a second reporting unit, configured to report the indication information by using message 3 in a contention-based random access process.

The terminal 400 further includes:
a returning module, configured to return to idle state or inactive state after a random access response is received.

The receiving module 410 includes:
a receiving submodule, configured to receive the configuration information by using non-access stratum NAS signaling.

It should be noted that, the terminal in some embodiments of the present disclosure determines, by using the configuration information, whether to enter connected state at the preset moment, instead of entering connected state to complete a complete positioning process when a period arrives or a maximum reporting interval arrives, thereby reducing power consumption of the terminal.

It should be noted that, division of the modules of the terminal is merely logical function division, and in actual implementation, the modules may be all or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes the program code and performs the functions of the foregoing determining module. The implementations of other modules are similar thereto. In addition, all or some of these modules may be integrated together or implemented independently. The processing element herein may be an integrated circuit having a signal processing capability. In an implementation process, the steps in the foregoing method or the foregoing modules can be implemented by using a hardware integrated logical circuit in the processing element, or by using instructions in a form of software.

For example, the modules may be configured as one or more integrated circuits for implementing the foregoing method, for example, one or more application-specific integrated circuits (ASIC), one or more microprocessors (digital signal processor, DSP), or one or more field programmable gate arrays (FPGA). For another example, when a module above is implemented by invoking program code by using a processing element, the processing element may be a general-purpose processor, for example, a central processing unit (CPU) or another processor that can invoke program code. For another example, these modules may be integrated together, and implemented in a form of a system-on-a-chip (SOC).

Figure 5:
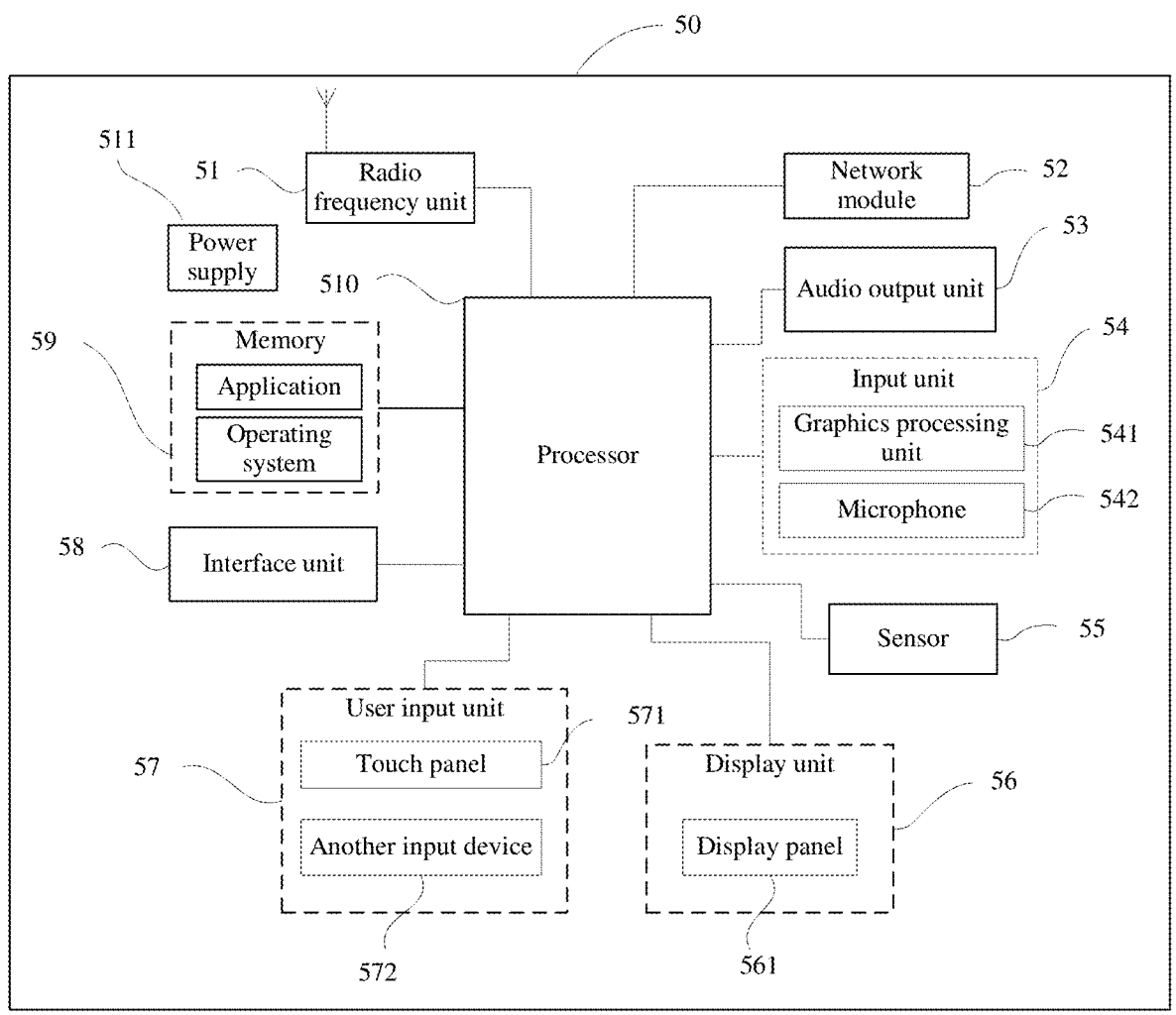
FIG. 5 is a block diagram of a terminal according to some embodiments of the present disclosure.

To better implement the foregoing objective, optionally, FIG. 5 is a schematic structural diagram of hardware of a terminal according to the embodiments of the present disclosure. A terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. Those skilled in the art may understand that the terminal structure shown in FIG. 5 does not constitute a limitation on the terminal. The terminal may include more or fewer components than those shown in the figure, or some components may be combined, or there may be a different component arrangement. In some embodiments of the present disclosure, the terminal includes but is not limited to a mobile phone, a tablet computer, a notebook computer, a palmtop computer, an in-vehicle terminal, a wearable device, a pedometer, and the like.

The radio frequency unit 51 is configured to receive configuration information; and
the processor 510 is configured to determine, in idle state or inactive state based on the configuration information, whether to enter connected state at a preset moment to complete a positioning procedure.

The terminal in some embodiments of the present disclosure determines, by using the configuration information, whether to enter connected state at the preset moment, instead of entering connected state to complete a complete positioning process when a period arrives or a maximum reporting interval arrives, thereby reducing power consumption of the terminal.

It should be understood that, in some embodiments of the present disclosure, the radio frequency unit 51 may be configured to receive and send information or a signal in a call process. For example, after receiving downlink data from a base station, the radio frequency unit 51 sends the downlink data to the processor 510 for processing. In addition, the radio frequency unit 51 sends uplink data to the base station. Usually, the radio frequency unit 51 includes but is not limited to an antenna, at least one amplifier, a transceiver, a coupler, a low noise amplifier, a duplexer, and the like. In addition, the radio frequency unit 51 may communicate with a network and another device through a wireless communication system.

The terminal provides wireless broadband Internet access for the user by using the network module 52, for example, helping the user to send and receive an e-mail, browse a web page, and access streaming media.

The audio output unit 53 may convert audio data received by the radio frequency unit 51 or the network module 52 or stored in the memory 59 into an audio signal and output the audio signal as a sound. In addition, the audio output unit 53 may further provide an audio output (for example, a call signal received voice, or a message received voice) related to a specific function implemented by the terminal 50. The audio output unit 53 includes a speaker, a buzzer, a receiver, and the like.

The input unit 54 is configured to receive an audio signal or a video signal. The input unit 54 can include a graphics processing unit (GPU) 541 and a microphone 542. The graphics processing unit 541 processes image data of static pictures or videos obtained by an image capturing apparatus (for example, a camera) in a video capturing mode or an image capturing mode. A processed image frame can be displayed on the display unit 56. The image frame processed by the graphics processor 541 may be stored in the memory 59 (or another storage medium) or sent by using the radio frequency unit 51 or the network module 52. The microphone 542 can receive sound and can process such sound into audio data. The processed audio data may be converted, in a call mode, into a format that can be sent to a mobile communication base station by using the radio frequency unit 51 for output.

The terminal 50 further includes at least one type of sensor 55, such as a light sensor, a motion sensor, and another sensor. Optionally, the light sensor includes an ambient light sensor and a proximity sensor, where the ambient light sensor can adjust brightness of a display panel 561 based on brightness of ambient light, and the proximity sensor can turn off the display panel 561 and/or backlight when the terminal 50 is moved towards the ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 55 may further include a fingerprint sensor, a pressure sensor, an iris sensor, a molecular sensor, a gyroscope, a barometer, a hygrometer, a thermometer, an infrared sensor, and the like. Details are not described herein.

The display unit 56 is configured to display information entered by a user or information provided for a user. The display unit 56 may include a display panel 561. The display panel 561 may be configured in a form of a liquid crystal display (LCD), an organic light-emitting diode (OLED), or the like.

The user input unit 57 may be configured to receive input numeral or character information, and generate key signal input related to user setting and functional control of the terminal. Optionally, the user input unit 57 includes a touch panel 571 and another input device 572. The touch panel 571 is also referred to as a touchscreen, and may collect a touch operation performed by a user on or near the touch panel 571 (such as an operation performed by a user on the touch panel 571 or near the touch panel 571 by using any proper object or accessory, such as a finger or a stylus). The touch panel 571 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 510, and can receive and execute a command sent by the processor 510. In addition, the touch panel 571 can be implemented by various types such as a resistive type, a capacitive type, an infrared ray type or a surface acoustic wave type. The user input unit 57 may include another input device 572 in addition to the touch panel 571. Optionally, the another input device 572 may include, but is not limited to, a physical keyboard, a functional button (such as a volume control button or a power on/off button), a trackball, a mouse, and a joystick. Details are not described herein again.

Optionally, the touch panel 571 can cover the display panel 561. When detecting a touch operation on or near the touch panel 571, the touch panel 571 transmits the touch operation to the processor 510 to determine a type of a touch event. Then, the processor 510 provides corresponding visual output on the display panel 561 based on the type of the touch event. In FIG. 5, the touch panel 571 and the display panel 561 are used as two independent components to implement input and output functions of the terminal. However, in some embodiments, the touch panel 571 and the display panel 561 may be integrated to implement the input and output functions of the terminal. This is not specifically limited herein.

The interface unit 58 is an interface connecting an external apparatus to the terminal 50. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 58 may be configured to receive input (for example, data information and power) from the external apparatus and transmit the received input to one or more elements in the terminal 50, or may be configured to transmit data between the terminal 50 and the external apparatus.

The memory 59 may be configured to store a software program as well as every kind of data. The memory 59 may primarily include a program storage area and a data storage area, where the program storage area may store an operating system, an application (such as a sound playing function, an image playing function) required for at least one function, and the like; and the data storage area may store data (such as audio data, a phone book) created based on the use of a mobile phone. In addition, the memory 59 may include a high-speed random access memory, and may further include a non-volatile memory such as at least one magnetic disk storage component, a flash memory component, or another volatile solid-state storage component.

The processor 510 is a control center of the terminal, and connects all parts of the entire terminal by using various interfaces and lines. By running or executing a software program and/or a module stored in the memory 59 and invoking data stored in the memory 59, the processor 510 performs various functions of the terminal and data processing, to perform overall monitoring on the terminal. The processor 510 may include one or more processing units. Optionally, an application processor and a modem processor may be integrated into the processor 510. The application processor mainly processes an operating system, a user interface, an application, and the like. The modem processor mainly processes wireless communications. It may be understood that, alternatively, the modem processor may not be integrated into the processor 510.

The terminal 50 may further include the power supply 511 (such as a battery) that supplies power to each component. Optionally, the power supply 511 may be logically connected to the processor 510 by using a power management system, so as to implement functions such as charging, discharging, and power consumption management by using the power management system.

In addition, the terminal 50 includes some functional modules not shown. Details are not described herein.

Optionally, some embodiments of the present disclosure further provide a terminal, including a processor 510, a memory 59, and a computer program that is stored in the memory 59 and that can run on the processor 510. When the processor 510 executes the computer program, the processes of the foregoing positioning method embodiment are implemented and a same technical effect can be achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service PCS) phone, a cordless telephone set, a session initiation protocol (SIP) phone, a wireless local loop (WLL) station, or a personal digital assistant (PDA). The wireless terminal may also be referred to as a system, a subscriber unit (Subscriber Unit), a subscriber station, a mobile station, a mobile console, a remote station, a remote terminal, an access terminal, a user terminal, a user agent, or a user device. This is not limited herein.

Some embodiments of the present disclosure further provide a non-transitory computer-readable storage medium. The non-transitory computer-readable storage medium stores a computer program, and when a processor executes the computer program, the processes of the foregoing positioning method embodiment are implemented and a same technical effect can be achieved. To avoid repetition, details are not described herein again. The non-transitory computer-readable storage medium includes a read-only memory (ROM), a random access memory (RAM), a magnetic disk, or an optical disc.

A person of ordinary skill in the art may be aware that, in combination with the examples in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed operating process of the foregoing system, apparatus, and unit, refer to a corresponding process in the foregoing method embodiments. Details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, apparatuses, or units. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on this understanding, the essence of the technical solutions of this disclosure, or the part contributing to the prior art, or some of the technical solutions may be represented in the form of software products. The computer software products are stored in a storage medium, and include a number of instructions to enable a computer device (which may be a personal computer, a server, a network device, or the like) to perform all or some of the steps of the methods described in various embodiments of this disclosure. The storage medium includes various mediums, such as a USB flash disk, a removable hard disk, a ROM, a RAM, a magnetic disk, or an optical disc, that can store program code.

In addition, it should be noted that in the apparatus and method of the present disclosure, it is obvious that the components or steps may be decomposed and/or recombined. These decomposition and/or recombination shall be considered an equivalent solution of the present disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any of the steps or the components of the methods and the apparatuses of the present disclosure may be implemented in any computing apparatus (including a processor, a storage medium, and the like) or a computing apparatus network in the form of hardware, firmware, software, or a combination thereof. Those of ordinary skill in the art can implement this by using their basic programming skills after reading the description of the present disclosure.

It may be understood that the embodiments described in the embodiments of the present disclosure may be implemented by hardware, software, firmware, middleware, microcode, or a combination thereof. For hardware implementation, a processing unit may be implemented in one or more Application Specific Integrated Circuits (ASIC), digital signal processors (DSP), digital signal processing devices (DSP Device, DSPD), programmable logic devices (PLD), field-programmable gate arrays (FPGA), general purpose processors, controllers, microcontrollers, microprocessors, or other electronic units or a combination thereof used to perform the functions in the present disclosure.

For software implementation, the technology in the embodiments of the present disclosure may be implemented through modules (for example, procedures or functions) that perform the functions in the embodiments of the present disclosure. A software program may be stored in a memory and executed by a processor. The memory may be implemented in the processor or outside the processor.

Therefore, the objective of the present disclosure may also be implemented by running a program or a group of programs on any computing apparatus. The computing apparatus may be a well-known general-purpose apparatus. Therefore, the objective of the present disclosure may also be implemented by providing only a program product that includes program code for implementing the method or apparatus. In other words, such a program product also constitutes the present disclosure, and a storage medium storing such a program product also constitutes the present disclosure. Obviously, the storage medium may be any well-known storage medium or any storage medium to be developed in the future. It should also be noted that in the apparatus and method of the present disclosure, it is obvious that the components or steps may be decomposed and/or recombined. These divisions and/or recombinations should be considered as equivalent solutions of this disclosure. Moreover, the steps for performing the foregoing series of processing may be performed naturally in chronological order according to a described sequence, but do not necessarily need to be performed in chronological order, and some steps may be performed in parallel or independently.

The foregoing descriptions are merely optional implementations of the present disclosure. It should be noted that a person of ordinary skill in the art may make several improvements and polishing without departing from the principle of the present disclosure and the improvements and polishing shall fall within the protection scope of the present disclosure.

What is claimed is:

1. A positioning method, applied to a terminal and comprising:
   receiving configuration information; and
   determining, in an idle state or an inactive state based on the configuration information, whether to enter a connected state at a preset moment to complete a positioning procedure, wherein
   the determining, based on the configuration information, whether to enter the connected state at the preset moment comprises:
   detecting whether a detection condition in the configuration information is met at the preset moment; and
   if the detection condition is met, skipping entering the connected state, wherein
   the detection condition comprises:
   a change amount between a current location measurement amount of the terminal and a location measurement amount during the previous positioning being no more than a first preset threshold; wherein
   the location measurement amount comprises: a reference signal time difference (RSTD) in observed time difference of arrival (OTDOA) positioning, or reference signal received power (RSRP) in OTDOA positioning; wherein
   after the determining, based on the configuration information, whether to enter the connected state at the preset moment, the method further comprises:
   reporting indication information, in a case that it is determined not to enter the connected state, wherein the indication information comprises one of:
   first indication information indicating that the terminal does not move;
   second indication information indicating location difference information of the terminal; and
   third indication information indicating a difference value of positioning measurement information of the terminal; wherein
   the reporting indication information comprises:
   sending the indication information by using a data packet in inactive state.

2. The positioning method according to claim 1, wherein the preset moment comprises a period corresponding to a periodic event or time of arrival of a maximum reporting interval corresponding to a trigger event.

3. The positioning method according to claim 2, wherein the trigger event is triggered based on the time of arrival of the maximum reporting interval.

4. The positioning method according to claim 2, wherein the trigger event comprises an area event or a motion event, the area event and the motion event correspond to respective maximum reporting intervals.

5. The positioning method according to claim 1, wherein after the detecting whether the detection condition in the configuration information is met, the method further comprises:
   if the detection condition is not met, entering the connected state to complete the positioning procedure.

6. The positioning method according to claim 1, wherein the first indication information comprises one indication bit; and the second indication information or the third indication bit comprises N indication bits, and N is an integer greater than 1.

7. The positioning method according to claim 1, wherein the receiving configuration information comprises:
   receiving the configuration information by using non-access stratum (NAS) signaling.

8. A terminal, comprising a processor, a memory, and a program that is stored in the memory and executable on the processor, wherein the program, when executed by the processor, causes the terminal to perform:
   receiving configuration information; and
   determining, in an idle state or an inactive state based on the configuration information, whether to enter a connected state at a preset moment to complete a positioning procedure; and
   the program, when executed by the processor, causes the terminal to perform:
   detecting whether a detection condition in the configuration information is met at the preset moment; and
   if the detection condition is met, skipping entering the connected state, wherein
   the detection condition comprises:
   a change amount between a current location measurement amount of the terminal and a location measurement amount during the previous positioning being no more than a first preset threshold; wherein
   the location measurement amount comprises: a reference signal time difference (RSTD) in observed time difference of arrival (OTDOA) positioning, or reference signal received power (RSRP) in OTDOA positioning; and
   the program, when executed by the processor, causes the terminal to further perform:
   reporting indication information, in a case that it is determined not to enter the connected state, wherein the indication information comprises one of:
   first indication information indicating that the terminal does not move;
   second indication information indicating location difference information of the terminal; and third indication information indicating a difference value of positioning measurement information of the terminal; and the program, when executed by the processor, causes the terminal to perform:

sending the indication information by using a data packet in the inactive state.

9. The terminal according to claim 8, wherein the program, when executed by the processor, causes the terminal to further perform:

if the detection condition is not met, entering the connected state to complete the positioning procedure.

10. The terminal according to claim 8, wherein the program, when executed by the processor, causes the terminal to perform:

receiving the configuration information by using non-access stratum (NAS) signaling.

11. The terminal according to claim 8, wherein the preset moment comprises a period corresponding to a periodic event or time of arrival of a maximum reporting interval corresponding to a trigger event.

12. The terminal according to claim 11, wherein the trigger event is triggered based on the time of arrival of the maximum reporting interval.

13. The terminal according to claim 11, wherein the trigger event comprises an area event or a motion event, the area event and the motion event correspond to respective maximum reporting intervals.

14. The terminal according to claim 8, wherein the first indication information comprises one indication bit; and the second indication information or the third indication bit comprises N indication bits, and N is an integer greater than 1.

15. A non-transitory computer-readable storage medium, wherein the non-transitory computer-readable storage medium stores a computer program, and the computer program, when executed by a processor of a terminal, causes the processor to perform:

receiving configuration information; and determining, in an idle state or an inactive state based on the configuration information, whether to enter a connected state at a preset moment to complete a positioning procedure; and the computer program, when executed by the processor, causes the processor to perform:

detecting whether a detection condition in the configuration information is met at the preset moment; and if the detection condition is met, skipping entering the connected state, wherein the detection condition comprises:

a change amount between a current location measurement amount of the terminal and a location measurement amount during the previous positioning being no more than a first preset threshold; wherein the location measurement amount comprises: a reference signal time difference (RSTD) in observed time difference of arrival (OTDOA) positioning, or reference signal received power (RSRP) in OTDOA positioning; and the computer program, when executed by the processor, causes the processor to further perform:

reporting indication information, in a case that it is determined not to enter the connected state, wherein the indication information comprises one of:

first indication information indicating that the terminal does not move;

second indication information indicating location difference information of the terminal; and third indication information indicating a difference value of positioning measurement information of the terminal; and the computer program, when executed by the processor, causes the processor to perform:

sending the indication information by using a data packet in the inactive state.

16. The non-transitory computer-readable storage medium according to claim 15, wherein the computer program, when executed by the processor, causes the processor to further perform:

if the detection condition is not met, entering the connected state to complete the positioning procedure.

17. The non-transitory computer-readable storage medium according to claim 15, wherein the preset moment comprises a period corresponding to a periodic event or time of arrival of a maximum reporting interval corresponding to a trigger event.

18. The non-transitory computer-readable storage medium according to claim 17, wherein the trigger event is triggered based on the time of arrival of the maximum reporting interval.

19. The non-transitory computer-readable storage medium according to claim 17, wherein the trigger event comprises an area event or a motion event, the area event and the motion event correspond to respective maximum reporting intervals.

20. The non-transitory computer-readable storage medium according to claim 15, wherein the first indication information comprises one indication bit; and the second indication information or the third indication bit comprises N indication bits, and N is an integer greater than 1.

* * * * *